United States Patent
Barényi

[11] 3,800,604
[45] Apr. 2, 1974

[54] STEERING WHEEL FOR MOTOR VEHICLE
[75] Inventor: Béla Barényi, Maichingen, Germany
[73] Assignee: Daimler-Benz Aktiengesellschaft
[22] Filed: June 12, 1972
[21] Appl. No.: 261,620

[30] Foreign Application Priority Data
June 12, 1971 Germany.............................. 2129224

[52] U.S. Cl. ................................................. 74/552
[51] Int. Cl. ............................................. B62d 1/10
[58] Field of Search ..................................... 74/552

[56] References Cited
UNITED STATES PATENTS

| | | | |
|---|---|---|---|
| 3,540,304 | 11/1970 | Weiss | 74/552 X |
| 3,570,326 | 3/1971 | Albrecht et al. | 74/552 |
| 3,675,505 | 7/1972 | Henning | 74/552 |
| 1,303,236 | 5/1919 | Benson | 74/552 |
| 1,638,044 | 8/1927 | Lee | 74/552 |
| 1,915,769 | 6/1933 | Thomas | 74/552 |
| 2,872,539 | 2/1959 | Berner | 74/552 X |
| 3,714,844 | 2/1973 | Tsuda | 74/552 |
| 1,869,333 | 7/1932 | Bronson et al. | 74/552 X |

FOREIGN PATENTS OR APPLICATIONS

| | | | |
|---|---|---|---|
| 19,237 | 8/1913 | Great Britain | 74/552 |
| 1,188,980 | 4/1970 | Great Britain | 74/552 |

*Primary Examiner*—Benjamin W. Wyche
*Assistant Examiner*—F. D. Shoemaker
*Attorney, Agent, or Firm*—Craig and Antonelli

[57] ABSTRACT

A steering wheel for motor vehicles which includes a hub that is connected by way of spokes with a steering wheel rim whereby a hollow body, for example, a pot-shaped or cylindrically shaped hollow body serves as hub whose upper edge is disposed approximately in the plane of the steering wheel rim whereas the spokes are constructed as supports having equal uniform bending strength in relation to the axial direction of the hub.

36 Claims, 11 Drawing Figures

FIG.5
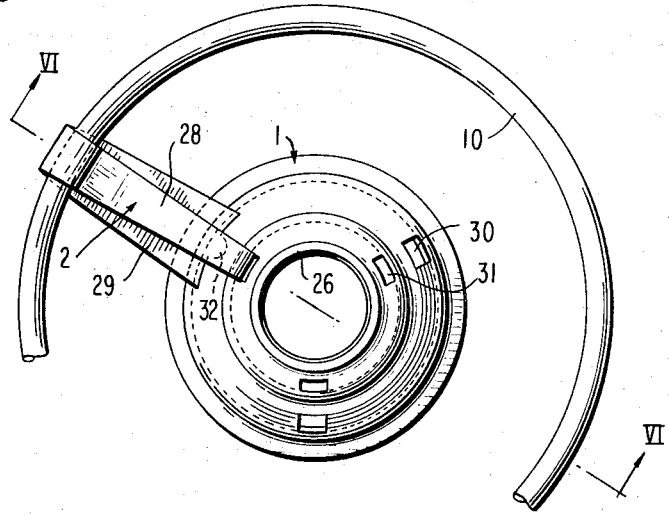
FIG.6
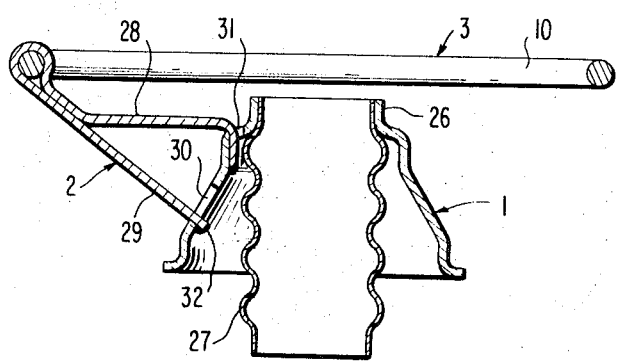
FIG.7

STEERING WHEEL FOR MOTOR VEHICLE

The present invention relates to a steering wheel for motor vehicles which includes a hub that is connected with a steering wheel rim by way of spokes.

The known steering wheel constructions do not by far satisfy the safety requirements which are made or should be made of the same in the modern motor vehicle construction. In order not to impair the visibility of the driver and for other structural reasons they possess in general relatively small hubs, which are adjoined by the spokes that are intended to transmit forces essentially only in the circumferential direction. In the axial direction of the steering wheel hub, i.e., in the direction of the steering spindle, the prior art steering wheels are relatively yielding in deformation so that in case of an accident the forces acting on the body of the driver are transmitted essentially by the small-surface hub, i.e., by the hub with small effective cross sectional areas. Even if these forces can be reduced by the use of a deformation member connected behind the steering wheel, they frequently lead already to considerable injuries by reason of the very small impact area.

Even until very recently, it has been attempted to create steering devices satisfactory as regards safety by a hydraulically damped steering column, on the one hand, and by a fully elastic steering wheel made, for example, of rubber. Both of these approaches have proved as erroneous in the meantime. The most recently known types of construction which also always appear again in patents, include several details particularly offensive as regards safety that relate to the construction and shape of the steering wheel rim, the spokes and the hub.

Until very recently, steering wheel rims of brittle and splintering material, for example, of wood, have been proposed over and over again. A high injury danger results therefrom. Additionally, allegedly very safe steering rims made from particularly elastic material are offered in advertising material. Even though such steering wheel rims are not themselves cause for injuries, they are also not able to protect the drive against an impact onto the parts disposed behind the same which are then the cause for injuries.

The use of bending-soft or bending-weak spokes, i.e., yielding in bending or weak in bending, for example, spokes with filigree cross sections, spokes made of horizontally arranged band material, spokes with large apertures, spokes made of unsuited material, for example, aluminum, or spokes which are characterized by particular length or sharp-edged profilings, is also clearly contrary to safety. These spokes are either directly the cause of injuries or at least offer no protection against impact onto parts disposed therebehind. An additional proposal includes constructing the spokes, which as such cannot be constructed too short, excessively long.

Unfavorable is also the use of spokes yielding in torsion or spokes systems which are created by inappropriate technology, i.e., material selection, or by an inappropriate arrangement, for example, only two spokes extending approximately horizontally through the steering wheel.

The hub arrangement is also frequently inappropriate. The combination of a spoke system yielding in bending and/or yielding in torsion with a spike-like hub projecting out of the spoke plane should be mentioned in connection therewith. Hubs offering a spike effect and having a minimal impact surface are always proposed again whereby the view is taken that the spear-effect is eliminated by the selection of rubber instead of steel. This, however, involves one of the most fatal, erroneous conclusions.

The injury consequences owing to steering wheel arrangements that are not thought through, can be reduced only in part by an impact pot. Above all it should be pointed out in particular that the accident research even to date considers the so-called impact force as the sole criterion. However, still other criteria frequently play significant roles such as, for example, protuberances or even points that remain or form themselves at the deforming spokes or steering wheel rims.

The present invention is now concerned with the task to provide, without impairing the through-vision field, a steering wheel far-reachingly rigid inherently in the axial direction and nonetheless of light-weight, which additionally requires only a slight manufacturing expenditure. The present invention essentially consists in that a pot-shaped or cylindrically shaped hollow body serves as hub whose upper rim or edge is disposed approximately in the plane of the steering wheel rim whereas the spokes are constructed with respect to the axial direction of the hub as bearers of equal and uniform bending strength. Such a steering wheel can be manufactured in a simple manner. It is light-weight yet very rigid in the axial direction so that the safety of the driver is considerably increased.

Provision is made in one advantageous embodiment of the present invention that a deformation member adjoins the hub, which is adapted to be deformed into the hollow body forming the hub. The available deformation path which has decisive significance for the absorption of the deformation work can be increased by this construction.

In an advantageous embodiment of the present invention, sheet metal strips which are disposed upright or on edge in the axial direction of the hub serves as spokes, whose height decreases from the hub outwardly toward the steering wheel rim. These spokes possess a high rigidity in the axial direction of the steering wheel whereas the through-vision field is further increased compared to the known types of construction since these narrow spokes practically do not impair the vision.

In a further embodiment of the present invention, provision is made that at least one spoke, especially the spoke which is disposed in the lower area or at the bottom when driving straight, is constructed as open or closed profile whose profile cross section decreases in the radial direction from the inside toward the outside. The recognition of this invention is thereby utilized that it is decisive to construct the lower area of the steering wheel of large-surface and deformation-rigid because the upper body of a drive impinges thereon in case of an accident.

In a still further advantageous embodiment of the present invention, each spoke consists of a sheet metal strip extending approximately in prolongation of the upper edge or rim of the hub and of a sheet metal strip starting in the area of the lower edge or rim of the hub and rising upwardly toward the steering wheel rim. This embodiment is particularly simple from a structural point of view.

A further structural simplification is achieved thereby if the two sheet metal strips are pre-bent V-shaped in one piece from band material and are placed around the metal core of the steering wheel rim. This type of construction permits an advantageous connection to the steering wheel rim.

Accordingly, it is an object of the present invention to provide a steering wheel for motor vehicles which avoids by simple means the aforementioned shortcomings and drawbacks encountered in the prior art.

Another object of the present invention resides in a steering wheel construction for motor vehicles which considerably increases the safety thereof.

A further object of the present invention resides in a steering wheel for motor vehicles which does not involve the disadvantages of relatively very small impact surfaces as presently exist in the known steering wheel constructions.

Still another object of the present invention resides in a steering wheel for motor vehicles which considerably reduces the danger of injuries in case of an accident, especially by the hub thereof.

A further object of the present invention resides in a steering wheel for motor vehicles which is simple in construction and relatively inexpensive to manufacture yet provides excellent protection against impact of the drive body on the parts of the steering system disposed behind, i.e., underneath the steering wheel.

Another object of the present invention resides in a relatively economic steering wheel structure that is characterized by excellent mechanical properties without impairing the good visibility through the steering wheel.

These and further objects, features and advantages of the present invention will become more apparent from the following description when taken in connection with the accompanying drawing which shows, for purposes of illustration only, several embodiments in accordance with the present invention, and wherein:

FIG. 5 is a partial top plan view of a further embodiment of a steering wheel in accordance with the present invention;

FIG. 6 is a partial cross-sectional view, taken along line VI—VI of FIG. 5;

FIG. 7 is an elevational view of a detail of the steering wheel of FIGS. 5 and 6;

Figure 1:
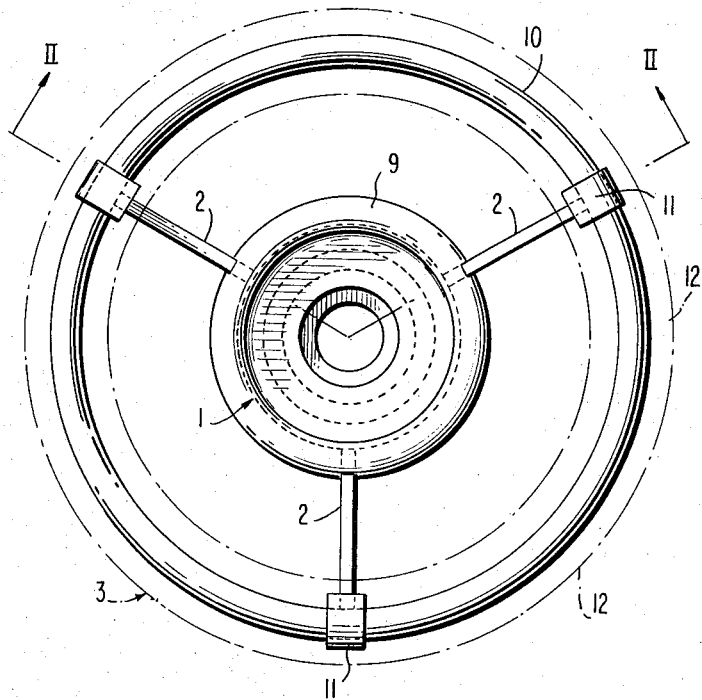
FIG. 1 is a top plan view of a steering wheel according to the present invention.

Referring now to the drawing wherein like reference numerals are used throughout the various views to designate corresponding parts, and more particularly to FIG. 1, the steering wheel illustrated in this figure includes a hub generally designated by reference numeral 1 which is connected with a steering wheel rim generally designated by reference numeral 3 by way of three spokes 2 arranged at angular spacings of 120°. The spokes 2 are so arranged in the position of the steering wheel for the straight drive corresponding to the plan view of FIG. 1, one spoke 2 is disposed vertically in the lower half of the steering wheel whereas the other two spokes 2 are arranged in the upper half of the steering wheel. The hub 1 is constructed in this embodiment from sheet metal as pot-shaped hollow body which includes cylindrical walls 4 and a flat bottom 5. The flat bottom 5 is provided with a central aperture 6. A deformation pot 7 (FIG. 1) adjoins the bottom 5, which is secured at a steering spindle (not shown) by conventional means.

Figure 2:
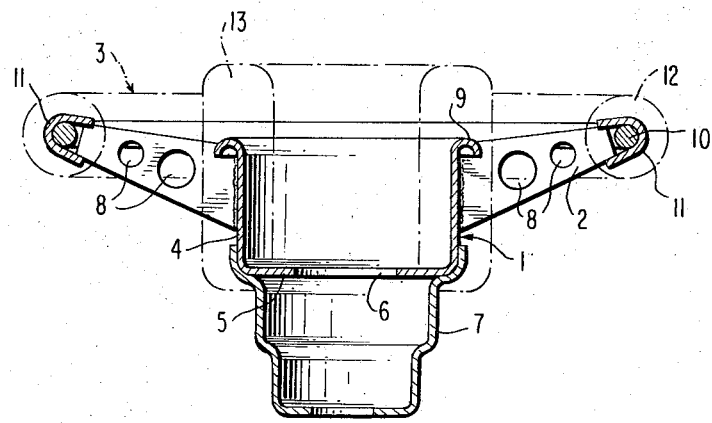
FIG. 2 is a cross-sectional view taken along line II—II of FIG. 1.

On-edge or upright sheet metal strips provided with apertures 8 for purposes of weight-saving, serve as spokes 2, which are welded to the cylindrical walls 4 of the hub 1. The upper edge of the sheet metal strips extends approximately in the plane of the upper rim 9 of the hub 1 (FIG. 2) whereas the lower edges of the sheet metal strips start in proximity of the bottom 5 of the hub 1 and rise outwardly toward a metal core 10 of the steering wheel rim 3. In this manner, the spokes 2 are constructed as supports or bearers of uniform, equal bending rigidity or bending strength in the axial direction of the hub 1. The rim 9 is flanged or beaded over in the outward direction and with slots provided therein surrounds from above the sheet metal strips forming the spokes 2 so that torques can be transmitted to an adequate extent in the circumferential direction. Additionally, the welding seams are extended up to within the area of the beaded-over rim 9.

Within the area of the connecting places of the spokes 2 to the steering wheel rim 3, U-shaped sheet metal members 11 are placed about the metal core 10 thereof, whose legs accommodate therebetween the upper edge and the lower edge of the sheet metal strips forming the spokes 2. The sheet metal strips are welded to these legs. The steering wheel rim 3 is completed by a synthetic material casing or sheathing 12 indicated in dash and dot lines and made, for example, of any suitable known plastic material. The cylindrical walls 4 of the hub 1 are additionally covered off with a cylindrical foamed material member 13 which projects upwardly above the steering wheel rim 3.

Figure 3:
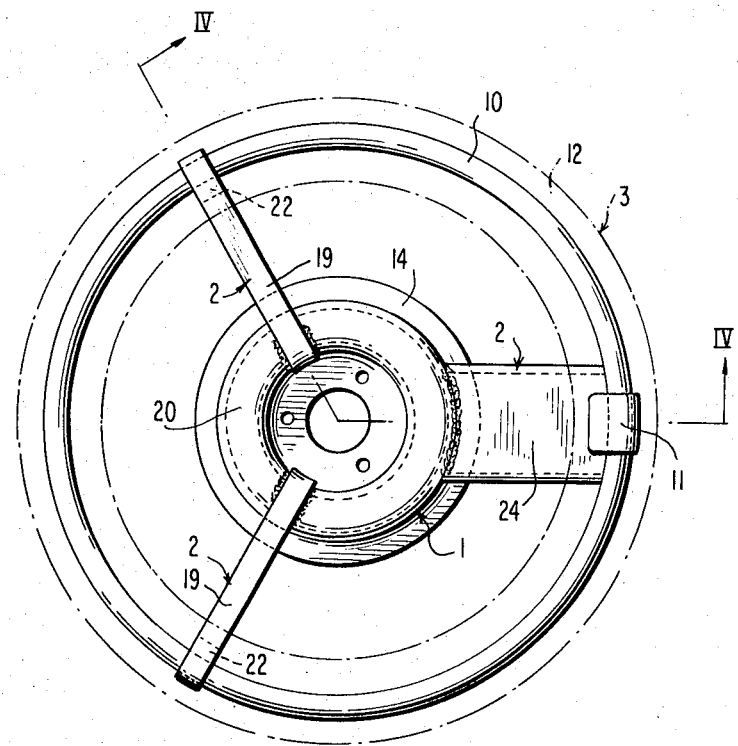
FIG. 3 is a top plan view of another embodiment of a steering wheel in accordance with the present invention.
Figure 4:
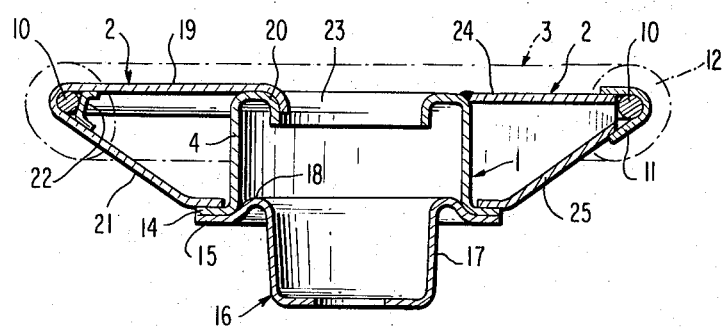
FIG. 4 is a cross-sectional view taken along line IV—IV of FIG. 3.

The steering wheel illustrated in FIGS. 3 and 4 also includes a hub generally designated by reference numeral 1 which is connected with a steering wheel rim generally designated by reference numeral 3 by way of three spokes 2 arranged at angular distances of 120°. The lower rim of the pot-shaped hollow body which includes cylindrical walls 4 is constructed as outwardly projecting flange 14. A flange 15 of a deformation pot generally designated by reference numeral 16 is connected to this flange 14, whose substantially cylindrical part 17 adjoins the flange 15 by way of a groove-shaped recess or indentation 18. The diameter of the cylindrical part 17 of the deformation pot 16 is smaller than the diameter of the hollow body forming the hub 1 so that in case of an accident, the deformation pot 16 can deform into the hub 1.

In this embodiment, two different constructions of spokes are provided. The two spokes 2 which are disposed in the upper area of the steering wheel when the latter is in a position corresponding to the straight drive of a vehicle, consist of a V-shaped pre-bent band material whose one leg 19 is disposed in the plane of the upper rim 20 of the hub 1 whereas the other leg 21 rises from the flange 14 of the hub toward the metal core 10 of the steering wheel rim 3. The sheet metal strips are placed above the metal core 10 and by means of U-shaped sheet metal profile members 22 are additionally connected with each other by spot-welding or the like within the area of the metal core 10. The lower leg 21 rests from above on the flange 14 and is secured thereon by welding or the like. The upper leg 19 which rests on the inwardly bent-off upper rim 20 of the hub, is welded to the latter. The rim 20 which includes a central aperture 23 is angularly bent off in the downward direction whereby the upper leg 19 of the sheet metal strips follows this angularly bent configuration.

The spoke 2 which is disposed in the lower area of the steering wheel and which extends vertically when the steering wheel is in a position corresponding to the straight drive of the vehicle, is constructed in the illustrated embodiment as hollow profile or sectional member. The top side 24 of the hollow profile is welded to the cylindrical part 4 of the hub 1 on the outside flush with the rim 20 thereof. The rim portion 25 forming the bottom side of the hollow profile rests on the flange 14 and is secured on the same by welding or the like. The bottom 25 of the hollow profile thereby rises toward the metal core 10 of the steering wheel rim 3. The connection between the hollow profile and the steering wheel rim 3 takes place in a manner corresponding to the embodiment according to FIGS. 1 and 2 by way of U-shaped sheet metal members 11 which are placed about the metal core 10 and which abut from above and below at the rim portions 24 and 25 of the hollow profile and are welded thereto.

The embodiment of the present invention illustrated in FIGS. 5 to 7 includes also a hub generally designated by reference numeral 1 which is connected with a steering wheel rim generally designated by reference numeral 3 by way of three spokes generally designated by reference numerals 2 and arranged at angular distances of 120°, whereby only the metal core 10 is shown of the steering wheel rim 3. The hub 1 consists of an essentially conically shaped, pot-like hollow body whose upper rim 26 terminates closely below the plane of the steering wheel rim 3. An impact tube 27 is secured at this rim 26, which in the downward direction projects beyond the hub 1 and serves for the fastening of a steering column (not shown). Also, in this embodiment, the impact tube 27 serving as deformation member can deform into the hub 1 in case of an impact so that a large deformation path is available for the absorption of deformation work.

The spokes 2 are constituted by V-shaped bent sheet metal strips made from band material whose upper leg 28 and lower leg 29 are extended into apertures 31 and 30, respectively, of the hub 1. The ends of the leg portions 28 and 29 are thereby welded to the hub 1 on the inside thereof, as shown in FIG. 6. The upper leg 28 thereby extends essentially parallel to the plane of the steering wheel rim 3. Its end projecting into the hollow body forming the hub 1 is angularly bent off in the downward direction and abuts inwardly at the wall of the hub 1. The lower leg 29 extends upwardly outwardly at an inclination toward the metal core 10 of the steering wheel rim 3. The V-shaped bent sheet metal strip which is illustrated in FIG. 7 in its extended dimension unfolded in the plane of the drawing, projects through the aperture 30 only with a tongue portion 32 which is welded to the hub 1 on the inside thereof.

The V-shaped pre-bent sheet metal strip surrounds the metal core 10 of the steering wheel rim 3. Closely below the metal core 10, the upper leg portion 28 and the lower leg portion 29 abut against one another. They are connected with each other within this area by spot-welding or the like.

In the embodiment of the present invention illustrated in FIGS. 8–11, the lower rim 38 of the pot-shaped hub generally designated by reference numeral 1 is connected with a dish-shaped member 33 of annular configuration, to which is secured a deformation pot generally designated by reference numeral 34 by means of a flange 35. A groove-shaped recess or indentation 36 is provided between the essentially cylindrical deformation pot 34 which has a smaller diameter than the hub 1 and the flange 35. Also in this embodiment, the deformation pot 34 can deform into the hollow space enclosed by the hub 1.

Figure 8:
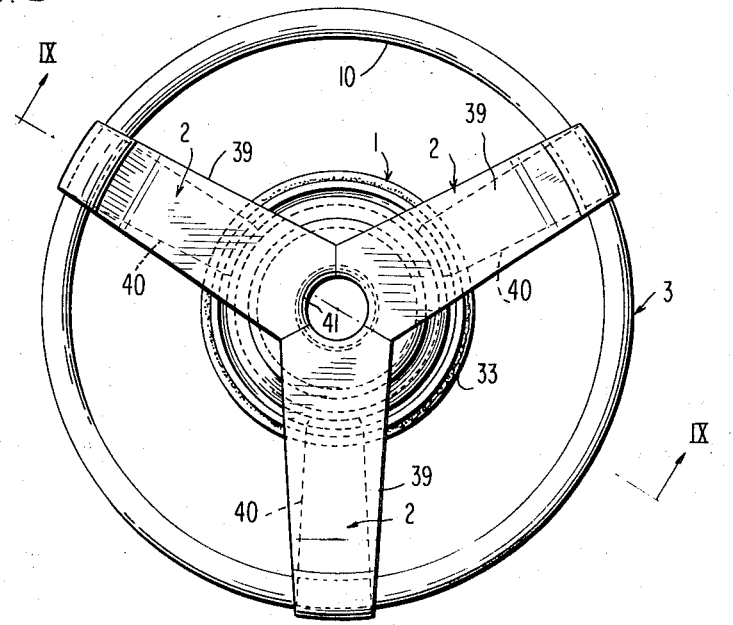
FIG. 8 is a top plan view of a still further modified embodiment of a steering wheel in accordance with the present invention.
Figure 9:
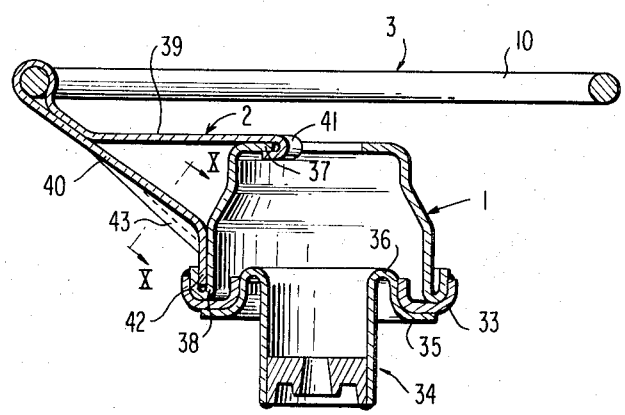
FIG. 9 is a cross-sectional view taken along line IX—IX of FIG. 8.
Figure 10:
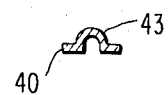
FIG. 10 is a cross-sectional view taken along line X—X of FIG. 9.
Figure 11:
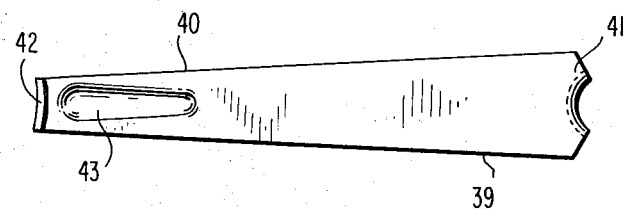
FIG. 11 is an elevational view of a detail of the steering wheel construction of FIGS. 8 and 9.

The spokes generally designated by reference numeral 2 connecting the hub 1 with the steering wheel rim 3 of which only the metal core 10 is illustrated, are again made of V-shaped pre-bent sheet metal strips which surround the metal core 10 and whose ends are secured to the hub 1 within the area of the upper rim 37 and the lower flanged over rim 38. The spokes 2 which are connected with the steering wheel rim 3 in the manner corresponding to the embodiment according to FIGS. 5 to 7 surround with their upper leg portion 39 the upper rim 37 of the hub 1. Their ends 41 (FIGS. 9 and 11) are constructed circular sector-shaped so that they abut respectively at the adjacent ends of the corresponding upper leg portions 39 of the other sheet metal strips (FIG. 8). In this embodiment, the flanging-over or beading-over about the upper rim 37 of the hub 1 suffices under certain circumstances so that an additional welding can possibly be dispensed with. The ends 42 of the lower leg portions 40 are bent off parallel to the hub 1 and are enclosed by the lower flanged- or beaded-over rim 38 of the hub 1. Under certain circumstances, the flanging- or beading-over also is adequate in that case to achieve a secure fastening. As illustrated in particular by FIGS. 10 and 11, the lower leg portions include an embossment 43 for reinforcing purposes.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A steering wheel for motor vehicles comprising: a hub, a steering wheel rim means, spoke means, connecting said hub with said steering wheel rim means said hub including a hollow body means having an upper rim portion disposed approximately in the plane of said steering wheel rim means, said spoke means being constructed as bearer means of substantially equal bending strength in relation to the axial direction of the hub.

2. A steering wheel according to claim 1, wherein said hollow body means is pot-shaped.

3. A steering wheel according to claim 1, wherein said hollow body means is cylindrically shaped.

4. A steering wheel according to claim 1, wherein deformation means are provided adjoining said hub, said deformation means being deformable into said hollow-body means.

5. A steering wheel according to claim 4, wherein said deformation means includes a deformation pot arranged at a lower rim of said hub, said deformation pot having a smaller diameter than the diameter of said hub.

6. A steering wheel according to claim 5, wherein said deformation pot includes an outwardly extending flange secured at the hub.

7. A steering wheel according to claim 6, wherein a substantially groove-shaped recess is provided in the area in which said flange adjoins the remaining substantially cylindrical portion.

8. A steering wheel according to claim 4, wherein said hub is conically constructed and includes an upper rim portion, and impact tube means forming part of the deformation means and projecting beyond the hub in the downward direction is secured at said upper rim portion.

9. A steering wheel according to claim 1, wherein said spoke means includes sheet metal strip means disposed substantially upright in the axial direction of the hub means, the height of the sheet metal strips decreasing from the hub in the outward direction toward said steering wheel rim means.

10. A steering wheel according to claim 9, wherein said sheet metal strip means are welded to the outside of the hub, said hub including an upper rim portion flanged-over toward the outside and surrounding said sheet metal strip means, said sheet metal strip means including a corresponding slot provided in the respective area of said rim portion.

11. A steering wheel according to claim 10, wherein at least one spoke means is constructed as profile member whose profile cross-section decreases in the radial direction from the inside toward the outside.

12. A steering wheel according to claim 11, wherein said profile member has an open profile.

13. A steering wheel according to claim 11, wherein said profile member has a closed profile.

14. A steering wheel according to claim 11, wherein said spoke means constructed as profile member is the spoke means disposed at the bottom of the steering wheel when the steering wheel is in the position corresponding to a straight drive of the vehicle.

15. A steering wheel according to claim 11, wherein said steering wheel rim means includes a metal core, an approximately U-shaped sheet metal member surrounding said metal core within the area of said connecting places of the spoke means, said spoke means being retained between the leg portions of a corresponding U-shaped sheet metal member.

16. A steering wheel according to claim 1, wherein at least one spoke means is constructed as profile member whose profile cross-section decreases in the radial direction from the inside toward the outside.

17. A steering wheel according to claim 16, wherein said spoke means constructed as profile member is the spoke means disposed at the bottom of the steering wheel when the steering wheel is in the position corresponding to a straight drive of the vehicle.

18. A steering wheel according to claim 9, wherein said steering wheel rim means includes a metal core, an approximately U-shaped sheet metal member surrounding said metal core within the area of the connecting places of the spoke means, said spoke means being retained between the leg portions of a corresponding U-shaped sheet metal member.

19. A steering wheel according to claim 1, wherein said hub is provided with a lower rim, and each spoke means consists of a first sheet metal strip means extending approximately in prolongation of said upper rim and a second sheet metal strip means disposed within the area of the lower rim of the hub, said second sheet metal strip means rising upwardly from said lower rim toward said steering wheel rim means.

20. A steering wheel with a metal core in the steering wheel rim means according to claim 19, wherein said two sheet metal strip means are pre-bent, V-shaped from a one-piece band material, said metal strip means being placed about said metal core of said steering wheel rim means.

21. A steering wheel according to claim 20, wherein said two sheet metal strip means abut against one another with substantially flat surface portions thereof directly in front of said metal core of the steering wheel rim means, said two sheet metal strip means being connected with each other at said flat surface portions.

22. A steering wheel according to claim 21, wherein said connection in a spot-welded connection.

23. A steering wheel according to claim 20, wherein a welded in profile member is provided for connecting said two sheet metal strip means with each other within the area of the metal core of the steering wheel rim means.

24. A steering wheel according to claim 21, wherein said sheet metal strip means are provided with radial reinforcing embossments.

25. A steering wheel according to claim 19, wherein said hub is provided with an inwardly bent-off rim, one of said sheet metal strips means being welded to said hub resting from the outside on said inwardly bent-off rim.

26. A steering wheel according to claim 25, wherein said last mentioned sheet metal strip means is an upper sheet metal strip means folded-over the bent-off rim of the hub.

27. A steering wheel according to claim 26, wherein three spoke means are provided at angular distances of about 120°, said three spoke means being provided with inner ends constructed of annular sector-like shape abutting against one another.

28. A steering wheel according to claim 27, wherein said hub is provided at its lower end with an outwardly angularly bent-off rim, and the lower sheet metal strip means are welded to said lower outwardly angularly bent off rim.

29. A steering wheel according to claim 27, wherein said lower sheet metal strip means are bent-off downwardly in the axial direction of said hub and said lower angularly bent-off rim is beaded over about the edges of said lower sheet metal strip means.

30. A steering wheel according to claim 19, wherein apertures are provided in said hub and said sheet metal strip means extend through said apertures and are welded inwardly to said hub.

31. A steering wheel with a metal core in the steering wheel rim means according to claim 30, wherein said two sheet metal strip means are pre-bent, V-shaped from a one-piece band material, said sheet metal strip means being placed about said metal core of said steering wheel rim means.

32. A steering wheel with a metal core in the steering wheel rim means according to claim 29, wherein said two sheet metal strip means are pre-bent, V-shaped from a one-piece band material, said sheet metal strip means being placed about said metal core of said steering wheel rim means.

33. A steering wheel according to claim 19, wherein said two sheet metal strip means abut against one another with substantially flat surface portions thereof directly in front of the metal core of the steering wheel rim means, said two sheet metal strip means being connected with each other at said flat surface portion.

34. A steering wheel according to claim 19, wherein a welded-in profile member is provided in said two sheet metal strip means are connected with each other within the area of the metal core of the steering wheel rim means by said welded-in profile member.

35. A steering wheel according to claim 19, wherein said sheet metal strip means are provided with radial reinforcing embossments.

36. A steering wheel according to claim 19, wherein said deformation means adjoins the hub, said deformation means being deformable into said hollow body means forming said hub.

* * * * *